(12) United States Patent
Piestun et al.

(10) Patent No.: US 10,215,975 B2
(45) Date of Patent: Feb. 26, 2019

(54) METHOD AND/OR SYSTEM FOR STABILIZATION, TRACKING, AND/OR CONTROL OF MICROSCOPIC SYSTEMS

(71) Applicant: The Regents of the University of Colorado, a body corporate, Denver, CO (US)

(72) Inventors: Rafael Piestun, Boulder, CO (US); Wyatt Mohrman, Denver, CO (US); Ginni Grover, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 412 days.

(21) Appl. No.: 15/018,684

(22) Filed: Feb. 8, 2016

(65) Prior Publication Data
US 2016/0231553 A1 Aug. 11, 2016

Related U.S. Application Data

(60) Provisional application No. 62/113,259, filed on Feb. 6, 2015.

(51) Int. Cl.
| | |
|---|---|
| *G02B 21/16* | (2006.01) |
| *G02B 21/36* | (2006.01) |
| *G02B 21/12* | (2006.01) |
| *G02B 21/24* | (2006.01) |

(52) U.S. Cl.
CPC .......... *G02B 21/367* (2013.01); *G02B 21/12* (2013.01); *G02B 21/244* (2013.01); *G02B 21/245* (2013.01)

(58) Field of Classification Search
CPC .... G02B 21/367; G02B 21/245; G02B 21/12; G02B 21/244
See application file for complete search history.

(56) References Cited

U.S. PATENT DOCUMENTS

| | | | |
|---|---|---|---|
| 6,646,113 B1* | 11/2003 | Dreyfuss | C07K 14/475 435/252.3 |
| 9,179,131 B2* | 11/2015 | Foelling | G02B 27/0075 |
| 2005/0121596 A1* | 6/2005 | Kam | G01N 21/6458 250/201.2 |

(Continued)

*Primary Examiner* — Sathyanaraya V Perungavoor
*Assistant Examiner* — Howard D Brown, Jr.
(74) *Attorney, Agent, or Firm* — Maschoff Brennan; Paul G. Johnson

(57) ABSTRACT

Some embodiments of the invention include a system comprising a positioning device configured to a hold a sample and adjust a position of a sample in response to receiving a drift compensation signal; a first light source disposed to transilluminate the sample; a second light source disposed to epi-illuminate the sample; an optical system configured to receive light from the sample and generate a three-dimensional point spread function from the light from the sample; an image sensor disposed relative to the optical system that produces an image from the light collected from the sample via the optical system; and logic electrically coupled with the image detector and the positioning device, the logic configured to determine one or more drift compensation values from images imaged by the image detector, and configured to send one or more drift compensation signals to the positioning device.

21 Claims, 10 Drawing Sheets
(6 of 10 Drawing Sheet(s) Filed in Color)

(56) References Cited

U.S. PATENT DOCUMENTS

| | | | |
|---|---|---|---|
| 2011/0249866 A1* | 10/2011 | Piestun | H04N 13/204 382/103 |
| 2013/0126759 A1* | 5/2013 | Betzig | G01N 21/6458 250/459.1 |
| 2014/0340483 A1* | 11/2014 | Ritter | G01N 21/6458 348/46 |
| 2015/0185463 A1* | 7/2015 | Ohki | G02B 21/06 348/79 |
| 2016/0085062 A1* | 3/2016 | Kalkbrenner | G02B 21/006 348/49 |

* cited by examiner

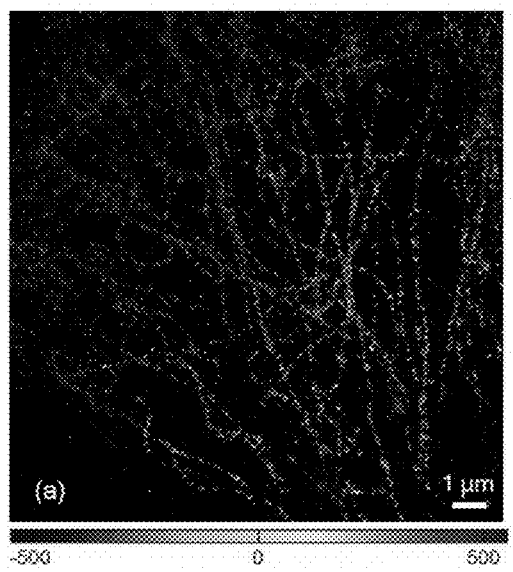
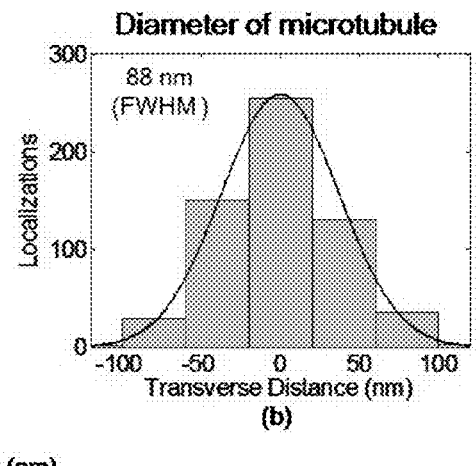
Figure 6A
Figure 6B
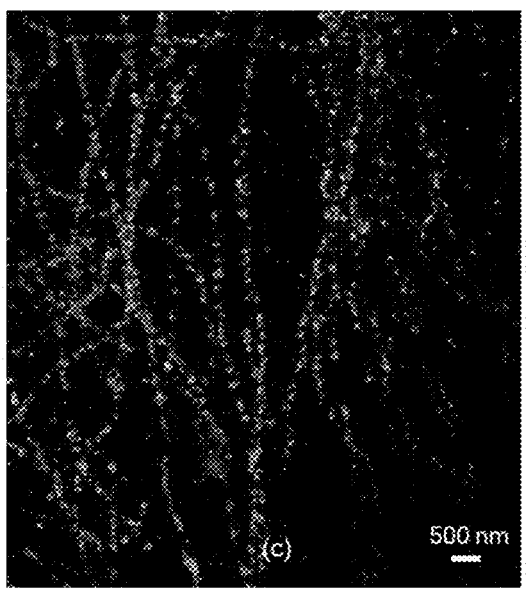
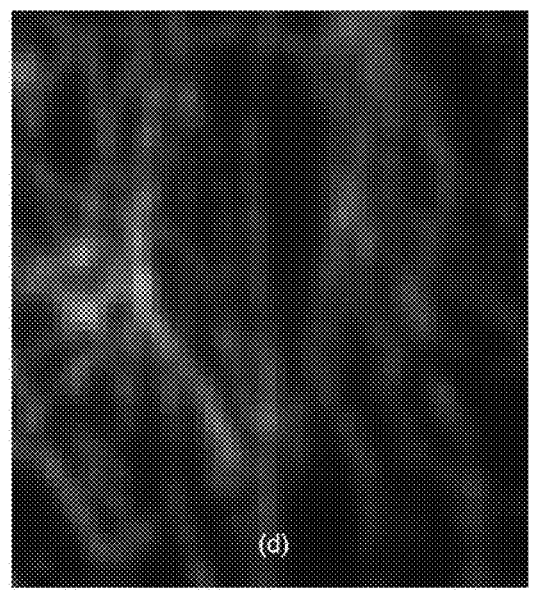
Figure 6C
Figure 6D

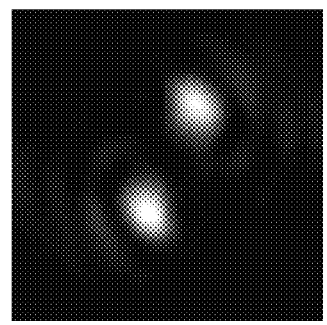 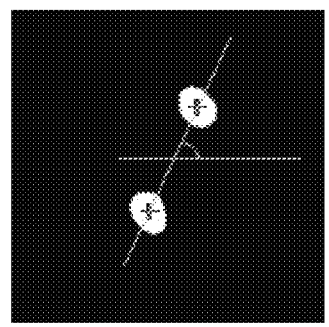
*Figure 7A*        *Figure 7B*

METHOD AND/OR SYSTEM FOR STABILIZATION, TRACKING, AND/OR CONTROL OF MICROSCOPIC SYSTEMS

This invention was made with government support under Grant Numbers 1063407, 14210782, and 0801680 awarded by The National Science Foundation. The government has certain rights in the invention.

SUMMARY

Some embodiments include a system comprising: a positioning device configured to a hold a sample and adjust a position of a sample in response to receiving a drift compensation signal; a first light source disposed to transilluminate the sample; a second light source disposed to epi-illuminate the sample; an optical system configured to receive light from the sample and generate a three-dimensional point spread function from the light from the sample; an image sensor disposed relative to the optical system that produces an image from the light collected from the sample via the optical system; and logic electrically coupled with the image sensor and the positioning device, the logic configured to determine one or more drift compensation values from images imaged by the image sensor, and configured to send one or more drift compensation signals to the positioning device.

In some embodiments, the one or more drift compensation values may be determined based on a drift compensation value of one or more fiducials imaged be the image sensor. In some embodiments, the one or more drift compensation values may be determined based on an average drift compensation value of a plurality of fiducials imaged be the image sensor. In some embodiments, the one or more drift compensation values may be determined based at least in part on an imaged points spread function of one or more fiducials.

In some embodiments, the optical system may include a phase mask that may be encoded with the three-dimensional point spread function. In some embodiments, the first light source and the second light source alternate illumination of the sample.

In some embodiments, the logic may be configured to determine drift and/or vibration compensation from one or more bright-field images and/or an average number of bright-field images. In some embodiments, the logic may be configured to determine drift and/or vibration compensation from a plurality of fiducial position measurements.

Some embodiments include a method comprising: illuminating a sample with a first light source, the sample including a plurality of fiducial markers; receiving through an optical system a first bright-field image of the sample when illuminated with the first light source, the optical system having a point spread function that varies with axial position of a point of the sample; determining a first plurality of positions for a plurality of fiducial markers in the first bright-field image; illuminating a sample with the first light source; receiving through the optical system a second bright-field image of the sample when illuminated with the first light source; determining a second plurality of positions for a plurality of fiducial markers in the second bright-field image; determining a drift value of each of the plurality of fiducial markers based on the first plurality of positions and the second plurality of positions; determining a sample movement value from the drift value; and sending the sample movement value to a positioning device upon which the sample may be disposed.

In some embodiments, the method may also include moving the sample based on the sample movement value.

In some embodiments, the position of each of the fiducial markers may be determined in three dimensions and the sample movement value comprises at least three values for each of the three dimensions.

In some embodiments, at least a portion of the position of each of the fiducial markers may be determined from a pixel location within the first bright-field image and the second bright-field image.

In some embodiments, at least a portion of the position of each of the fiducial markers may be determined from an angle of rotation of a manifestation of two lobes of a point spread function image of the fiducial.

In some embodiments, the method may further comprise: illuminating the sample with a second light source during a period of time when the first light source may not be illuminating the sample; and receiving through the optical system a third image of the sample when illuminated with the second light source; and comparing an average and/or peak values of the third image with a threshold value to determine whether the third image was produced from light from the first light source or light from the second light source.

Some embodiments may include a system comprising: a positioning device configured to a hold a sample and adjust a position of a sample in response to receiving a drift compensation signal; an optical system configured to receive light from the sample and generate a three-dimensional point spread function from the light from the sample; an image sensor disposed relative to the optical system that produces an image from the light collected from the sample via the optical system; a first light source disposed such that the positioning device is disposed between the first light source and the image sensor; and logic electrically coupled with the image sensor and the positioning device, the logic configured to determine one or more drift compensation values from images imaged by the image sensor, and configured to send one or more drift compensation signals to the positioning device.

In some embodiments, the image sensor may be configured to produce bright-field images of the sample when the sample is illuminated with the first light source.

In some embodiments, the system may include a second light source configured to illuminate the sample and disposed so that light from the second light source is reflected from the sample prior to being received at the image sensor.

In some embodiments, the second light source comprises an epi-illumination light source and the first light source comprises a transillumination light source. In some embodiments, the first light source and the second light source alternate illumination of the sample. In some embodiments, the logic is configured determine a first plurality of positions for a plurality of fiducial markers in the image. In some embodiments, at least a portion of a first plurality of position of each for a plurality of fiducial markers is determined at least in part from an angle of rotation of a manifestation of two lobes of a point spread function image of a fiducial.

BRIEF DESCRIPTION OF THE FIGURES

These and other features, aspects, and advantages of the present disclosure are better understood when the following Detailed Description is read with reference to the accompanying drawings.

The patent or application file contains at least one drawing executed in color. Copies of this patent or patent application FIG. 1A

FIGS. 6A, 6B, 6C, and 6D illustrate 3D super-resolution localization imaging with adaptive drift correction in three dimensions.

FIGS. 7A and 7B illustrate an example process for determining the axial position of a particle using a rotating point spread function.

DETAILED DESCRIPTION

Systems and/or methods are disclosed for localization microscopy without substantial long-term three-dimensional drift. In some embodiments, localization microscopy without substantial long-term three-dimensional drift includes drift on the order of magnitude lower than the typical precision of super-resolution systems. Embodiments described in this document include driftless imaging systems and/or methods.

Figure 1:
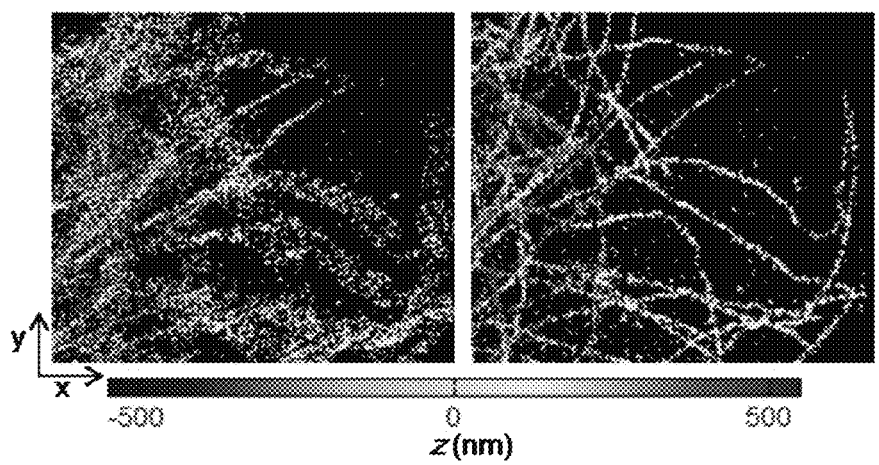
FIG. 1B is an example is an example illustration showing drift correction.

FIG. 1A and FIG. 1B illustrate drift correction. FIG. 1A illustrates a typical localization microscopy image reconstructed without drift correction. FIG. 1B illustrates a typical localization microscopy image reconstructed with drift correction. One techniques to address this problem is to place fiduciary markers on the coverslip in random or periodic arrays such as, for example, fluorescent beads, quantum dots, or gold nanoparticles. The precise position of the fiduciary markers (or bright beads) may be estimated in post processing and used for adjusting the single-molecule positions. A possible disadvantage of the technique is that these bright beads can compromise the much weaker single molecule fluorescence signal. Furthermore, sample preparation may be complicated because of the need to place markers with the right density and at the proper locations. Typically it is preferred to have the fluorescent fiduciaries away from the cellular region of interest to reduce any background light, a strategy that reduces the available field of view. Also, fluorescent markers often bleach or move from their position with respect to the coverslip, adding challenges to sample drift estimation using this method.

Another method is to perform time correlations of post processed localization data to calculate drift. One advantage of this method is that no fiduciary markers are needed. In practice, this method's precision depends on the number of localizations, the imaged structures, and the label density.

FIG. 1A and FIG. 1B illustrate the effect of 3D drift on super-resolution localization microscopy reconstructions. FIG. 1A illustrates a map of localizations without correcting for drift. In this example, the stage drifted about 400 nm in the horizontal axis, 800 nm in the vertical axis and within a range of 300 nm in the azimuth axis with manual feedback to avoid the sample from leaving the focal region. FIG. 1B illustrates a reconstruction map after correcting for drift using fluorescent bead fiducials.

Embodiments described in this document may include receiving a feedback signal that may be acquired with the same camera and optical system used for detecting the single-molecules. The feedback signal may be multiplexed in time with the single-molecule signals to avoid cross-talk. Fiducial markers may be placed with the sample and may include, for example, markers that do not bleach (e.g., gold nanoparticles). In some embodiments, the optical system may be optimized for 3D localization and may include an engineered point spread functions (PSF) for high precision over an extended depth range. In some embodiments, the integration time and/or the number of measurements may be optimized for each experiment to achieve a target precision (for example, one order of magnitude better than the single-molecule localization precision).

The point spread function may include any type of point spread function. For example, the point spread function may be a double helix point spread function (DH-PSF), which may produce an image that rotates with a rotation angle that varies as a function of axial position. The relationship between the rotation angle and the axial position can be found experimentally and/or during calibration to account for the presence of possible aberrations. For example, the double helix point spread function may manifest as a pair of intense lobes that rotate as the sample moves axially.

In some embodiments, the point spread function may be a three-dimensional point spread function.

Various other point spread function may have various other configurations. For example, the point spread function may manifest as a pair of intense lobes that separate as the object moves axially. For example, the size of the point spread function may encode depth information. For example, the changing shape of the point spread function may encode depth information.

In some embodiments, the feedback signal may be obtained periodically via a bright-field image of fiducial markers randomly located in proximity to the sample. For example, a first light source may be used to illuminate a sample in transmission and generate the light emission from the fiducial markers. One or more bright-field images may be created. In some embodiments, the method may not require any modification to the imaging side of an imaging setup. In some embodiments, the fiduciary-particle bright-field images may encode 3D information in their spatial distribution via a point spread function such as, for example, a double-helix point spread function. Processing algorithms (e.g., a real time processing algorithm) may be used to estimate the precise location of the fiduciary particle from these images and calculate the instantaneous 3D drift. The positioning device 255 uses the drift information to apply compensatory motion.

Figure 2:
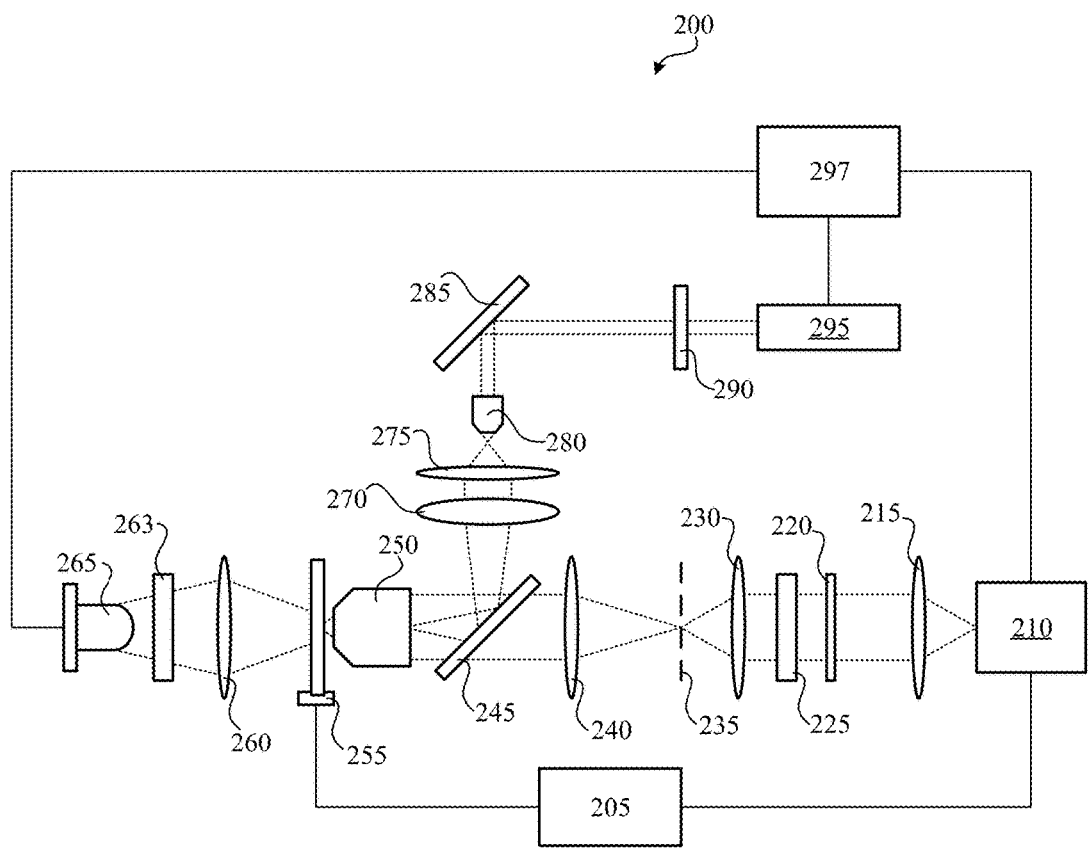
FIG. 2 is an example block diagram of a system that may perform drift compensation according to some embodiments described herein.

In some embodiments, a point spread function system is implemented for 3D super-resolution localization microscopy using a phase mask etched in glass. FIG. 2 is an example block diagram of a system that may perform drift compensation.

FIG. 2 is a block diagram of an imaging system 200 that may include a first light source 265 (e.g., a 670 nm diode) and a second light source 295 (e.g., 690 nm laser). The first light source 265 and the second light source 295 may illuminate a sample placed on a positioning device 255. The first light source 265, for example, may transilluminate a sample on the positioning device 255. Alternatively, the first light source 265, for example, may epi-illuminate a sample on the positioning device 255. The second light source 295, for example, may epi-illuminate a sample on the positioning device 255. In some embodiments, the second light source 295 may include one or more light sources. In some embodiments, the second light source 295 may include a light source for activation of the sample, deactivation of the sample, and/or excitation of the sample, etc.

Transillumination, for example, may refer to the illumination of a sample by transmitted light. Transillumination, for example, may generate a bright field image. Epi-illumination, for example, refers to the illumination of a sample by reflected light. A transillumination setup, for example, may include a light source(s) disposed behind or beneath a sample relative to the image sensor (or the objective) whereas in epi-illumination, for example, the light source and the image sensor (or the objective) are both be placed in front of the sample.

The positioning device 255, for example, may include a nanopositioner. In some embodiments, the positioning device 255 may include a piezo positioning device. In some embodiments, the positioning device 255 may include a one-, two-, or three-axis positioning device. In some embodiments, the positioning device 255 may move a sample on the positioning device in response to user input and/or in response to drift compensation signal or any type of signal form the feedback logic 205.

Various optical elements (e.g., lens, grating, phase masks, mirrors, objectives, etc.) may be disposed between either or both of the two light sources and the sample.

The imaging system 200 may be roughly broken into an imaging subsystem, a first illumination subsystem, and a second illumination subsystem.

The first illumination subsystem may include a number of components that transmit light from the positioning device 225 toward the image sensor 210. Light from the sample on the positioning device 255 may be collected by an image sensor 210 (e.g., EMCCD) through a phase mask 220 (e.g., DH Phase Mask) and/or other optical elements (e.g., lens, grating, phase masks, mirrors, objectives, etc.). The system may also include feedback logic 205 that can be used to correct for drift according to some embodiments described in this document.

For example, lenses 215, 230, and/or 240 may be placed between the image sensor 210 (e.g., EMCCD) and the positioning device 255. For example, one or more filters 225 may be disposed between the image sensor 210 and the positioning device 255. The filter 225, for example, may include a grating or wavelength filter. In some embodiments, a phase mask 220 may be disposed between the image sensor 210 and the positioning device 255 such as, for example, between the lens 215 and the lens 230. In some embodiments, light from the sample may pass through the mirror 245 (e.g., polychroic mirror), the lens 240, the lens 230, the filter 225, the phase mask 220, and/or the lens 215 prior to being imaged by the image sensor 210.

The first light source subsystem may include a number of components that direct light from the first light source 265 toward the sample on the positioning device 255. In some embodiments, the first light source 265 may include a light emitting device (LED) or any other type of light source. In some embodiments, a wavelength of the first light source may be used that matches the pass band of emission filters to reduce wasteful heating of the sample.

In some embodiments, a band pass filter 263 and/or a lens 260 may be disposed between first light source 265 and the positioning device 255. The band pass filter 263, for example, may cut off shorter wavelengths and/or avoid any excitation. The lens 260 may be used to focus and/or direct light toward the positioning device 255.

In some embodiments, the image sensor 210 may be configured to detect light signals emitted from the sample and/or fiduciary elements. The image sensor 210 may include, without limitation, a camera, an EMCCD camera, a CCD camera, a CMOS camera, a mercury cadmium telluride detector, etc. The image sensor 210 may be used both for image acquisition of the target element in the sample, as well as image acquisition of the fiduciary element that facilitates stabilizing the image by correcting for positional drift of the sample, target element or combination thereof.

In some embodiments, the imaging system 200 may include an objective 250. The objective 250 may include a detector (e.g., electron multiplying charge coupled device (EMCCD)) for light detection (e.g., Andor iXion DU897E CS0 #BV, South Windsor, Conn. USA). The objective 250 may include a 1.45NA 100× Nikon objective. Various other optics and/or detectors may be used.

In some embodiments, the phase mask 220 may generate a point spread function (PSF) that evolves or changes in a measureable way as a sample is translated axially. In some embodiments, the point spread function may be designed, for example, to increase the sensitivity to depth shifts, for example by optimizing a metric such as, for example, the Cramer Rao Bound (CRB) in the presence of background noise. In some embodiments, the same point spread function phase mask that modulates light from the second light source 295 (e.g., single-molecule fluorescent signals) may also modulates the fiduciary signal emanating from the fiduciary particles and/or any other imaged light. Alternatively or additionally, in some embodiments, different phase masks may modulate light from the sample regardless of the source of the light such as, for example, the single-molecule signal and the fiduciary signal may pass through different phase masks and/or through different optical paths and imaged on the same or different cameras.

In some embodiments, the phase mask 220 may include a double helix point spread function (DH-PSF) that may, for example, produce an image that rotates with a rotation angle that varies as a function of axial position. The relationship between the rotation angle and the axial position can be found experimentally or through calibration to account for the presence of possible aberrations. For example, the DH-PSF may manifest as a pair of intense lobes that rotate as the object moves axially.

In some embodiments, the phase mask 220 may manifest as a pair of intense lobes that separate as the object moves axially. In some embodiment, the size of the point spread function may encode depth information. In some embodiments, the changing shape of the point spread function may encode depth information. For example, a cylindrical lens acting as the phase mask may encode an astigmatic point spread function.

In some embodiments, the phase mask 220 may be placed at a plane conjugate to the pupil plane of an objective lens.

The second light source subsystem may include a number of components that direct light from the second light source 295 toward the sample on the positioning device 255. In some embodiments, the second light source 295 may include a laser light source. In some embodiments, the second light source 295 may include a 641 nm diode laser (e.g., a coherent cube laser). Various other light sources may be used as part of the second light source subsystem without limitation.

In some embodiments, the second light source 295 may direct light toward the sample through a filter 290 (e.g., band pass filter or stacked dual-band pass filter) and mirror 285. An objective 280 may also be used in conjunction with lens 270 and/or lens 275. The light may be reflected by a mirror 245 (e.g., a polychroic mirror, polychromatic mirror, or beam splitter) (e.g., a Semrock (Di01-R405/488/561/635)) that may be used to separate excitation light from the light source 295 and emission light from the sample. The light from the second light source may be directed to the sample through the objective 250.

In some embodiments, a dye may be used on the sample that has an emission band surrounding the wavelength of light of the first light source 265 and the second light source 295. For example, an Alexa 647 dye may be used on the sample. This dye may have a dye emission band of 670 nm to 720 nm. In order to match the dye emission band of 670 nm to 720 nm, the first light source 265 may produce light with a wavelength between the emission band of the dye. The first light source 265, for example, may produce light at 690 nm (e.g., ELJ-690-629 Roithner Lasertechnik, Austria, bandwidth 25 nm).

In some embodiments, the positioning device 255 may receive a feedback signal from the feedback logic 205 and/or may translate and/or position the sample on the positioning device 255 based on the feedback signal. The feedback signal, for example, may be a function of the detected drift as described in more detail herein.

The positioning device 255 may be configured to move the sample in the field of view of the microscope with position resolution, for example, sufficient to hold the fiduciary element fixed with nanometer-scale accuracy. The positioning device 255 may include, without limitation, a nanopositioning stage such as, for example, a piezo-driven nanopositioning stage. The positioning device 255 may be mounted to a microscope stage which may provide a coarser position of the sample. In some embodiments, the positioning device 255 may include a sample holder such as, for example, a microscope slide or coverslip, that can be used to hold a sample, or displaying the sample on its surface. The sample holder, for example, may be mounted onto the positioning device 255.

Figure 9:
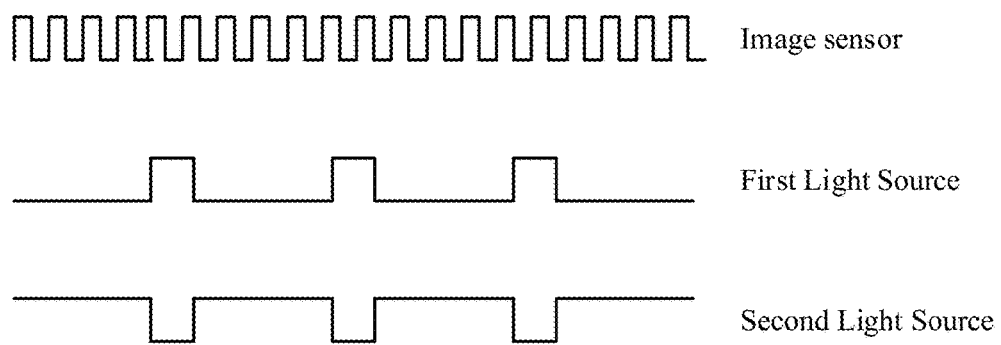
FIG. 9 illustrates the timing of excitation and acquisition according to some embodiments.

In some embodiments, the first light source 265, the second light source 295, and/or the image sensor 210 may be communicatively coupled and/or temporally synchronized such as, for example, via controller 297. The controller 297 may provide digital pulses to the image sensor 210, the first light source 265, and/or the second light source 295. Traces of example pulses are shown in FIG. 9. The first light source 265, for example, may be directly modulated in sync with the second light source 295. In some embodiments, the first light source may be on for longer periods of time than the second light source.

In some embodiments, the feedback logic 205 may include any type of computational system such as, for example, a computer, an FPGA, a controller, a micro controller, a processor, computational unit 1000, etc. In some embodiments, the feedback logic may include various electrical components that may amplify, filter, and/or measure electrical signals from the image sensor and/or the light sources and provide a feedback signal to the positioning device that may be used to change the position of the position device. The feedback logic, for example, can include one or more amplifiers, filed programmable gate arrays (FPGAs), comparators, controllers, processors, memories, user interfaces, logic, circuits, oscilloscopes, etc. The feedback logic may also include any or all components described in conjunction with computational system 1000 shown in FIG. 10. The feedback logic may also control the operation of the two light sources, the positioning device, the image sensor, other components, or some combination thereof.

In some embodiments, the light emitted from, reflected from, or transmitted through the sample may be further filtered by one or more filters 225 (e.g., band pass filter or stacked dual-band pass filter).

In some embodiments, fiducial markers may be imaged in bright-field illumination mode, either in transmission or epi-illumination mode, so that their emission light does not interfere with the imaging of the sample with light form the second light source 295 (e.g., epi-fluorescent signal of single molecules). Single molecule localization based super-resolution may include alternate switching between the first light source 265 and the second light source 295. The bright-field channel (e.g., with first light source 265) may be added intermittently into the switching sequence with minimal loss of acquisition time and/or photo damage of the imaging that occurs with second light source 295.

In some embodiments, no activation illumination (e.g., from the second light source 295) may be required as the dye molecules may spontaneously and stochastically activate. In some switching schemes, the first light source 265 may be pulsed with pulses that are interlaced with the second light source 295, another light source, and/or a deactivation laser or any other light source.

In some embodiments, the first light source 265 and an activation light source (e.g., possibly the second light source 295) may illuminate the sample simultaneously. In some embodiments, the activation emission may be blocked by an emission filter. Alternatively or additionally, the first light source 265 and the activation light source may be switched with an excitation light source so that the first light source 265 and the activation light source illuminate the sample simultaneously during first time periods and the activation light source illuminates the sample during second time periods. Alternatively or additionally, the first light source may be switched on in between the activation light source and the excitation light source. The pulsing frequency of the bright-field mode with the first light source can also be reduced in some cases according to the dynamics of the drift. For example, if the average detected drift over a period of time is less than threshold value and/or each drift value detected over a time period the switching frequency of the first light source may be lowered In some embodiments, the drift correction method may implement a PID controller where the camera images of the gold beads are processed using an angle-centroid, double-Gaussian, or Maximum likelihood estimator to find the 3D position and hence drift of the fiducial markers. In some embodiments, this control may be continuously active during the localization imaging process. In some embodiments the controller can implement a Kalman filter, a hybrid Kalman filter, or other control algorithms and strategies to bring back the sample into position or move it to a predetermined position.

In some embodiments, the algorithm may estimate the drift and/or implement the correction in two parts. First, for example, the algorithm may determine whether the most recent camera image is a bright-field image, for example, from light from the first light source, or an image from light from the second light source, for example, based on a criterion of image average and/or peak value. For example, if the image corresponds to bright fiducials the peak value may be higher and the wide field image may have a low average due to the lower number of fiducials as opposed to the usual large number of fluorescent molecules. This simple and fast method may enable asynchronous operation with the camera. The bright-field image may be added to a buffer that collects N images (N is user determined via an input in the software). The N images may be averaged and used for drift estimation. M user preselected regions containing images of the gold beads are selected and the 3D position of each of the gold beads is estimated. The current estimated position of each bead may be subtracted from its initial position and M drifts can then be calculated. Under the assumption of only translational sample motion, a weighted average (based on the bead intensity) of the M drifts may be calculated to estimate the sample drift.

In the second part of the algorithm, the estimated drift may be scaled down by a chosen proportionality constant and fed back to the positioning device 255 to shift appropriate distances in x, y, and/or z for compensation. In some embodiments, the estimated drift may be scaled down (proportional control) to maintain stability.

In some embodiments, the noise may be reduced by averaging N images and also by taking a mean of the M drift estimations of different beads. In some embodiments, the values of N=8-10 images and/or M=3-5 gold beads can be used with acquisition rates of 20 frames per second. Various other N, M, or acquisition rates may be used without limitation. The stage settling time may be 100 ms. In some embodiments, a proportionality factor may be in the range 0.4-0.7. In some embodiments, such as, for example, fluorophore yield, imaging speed, frequency of gold-bead imaging, and settling time of the nanopositioning stage, the optimal values of N and M can be changed. Another user adjustable parameter to control the stability of the system is the frequency of correction. Likewise, more complex PID controllers can be implemented for faster or more robust control.

In some embodiments, all or part of the imaging system 200 shown in FIG. 2 and/or in conjunction with embodiments described in this document may be used for vibration control of a sample. In some embodiments, all or part of the imaging system 200 shown in FIG. 2 and/or in conjunction with embodiments described in this document may be used to find the precise position of part of a sample and reposition it at a different location with high precision. In some embodiments, all or part of the imaging system 200 shown in FIG. 2 and/or in conjunction with embodiments described in this document may be used to track the position of part of a sample. In some embodiments, all or part of the imaging system 200 shown in FIG. 2 and/or in conjunction with embodiments described in this document may be used to compensate for drift and/or vibration in a nano-fabrication system. In some embodiments, all or part of the imaging system 200 shown in FIG. 2 and/or in conjunction with embodiments described in this document may be used to compensate for drift and/or vibration in a nano-fabrication system where the sample is modified by wide field lithography. In some embodiments, all or part of the imaging system 200 shown in FIG. 2 and/or in conjunction with embodiments described in this document may be used to track and re-position the sample in a nano-fabrication system where the sample is modified by direct laser writing lithography.

Figure 3A:
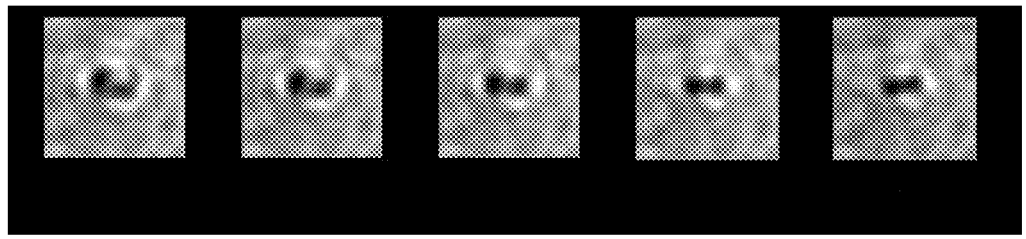
FIG. 3(a) illustrates a particle as seen through a point spread function microscope that evolves as the axial position of the particle changes according to some embodiments described herein.
Figure 3B:
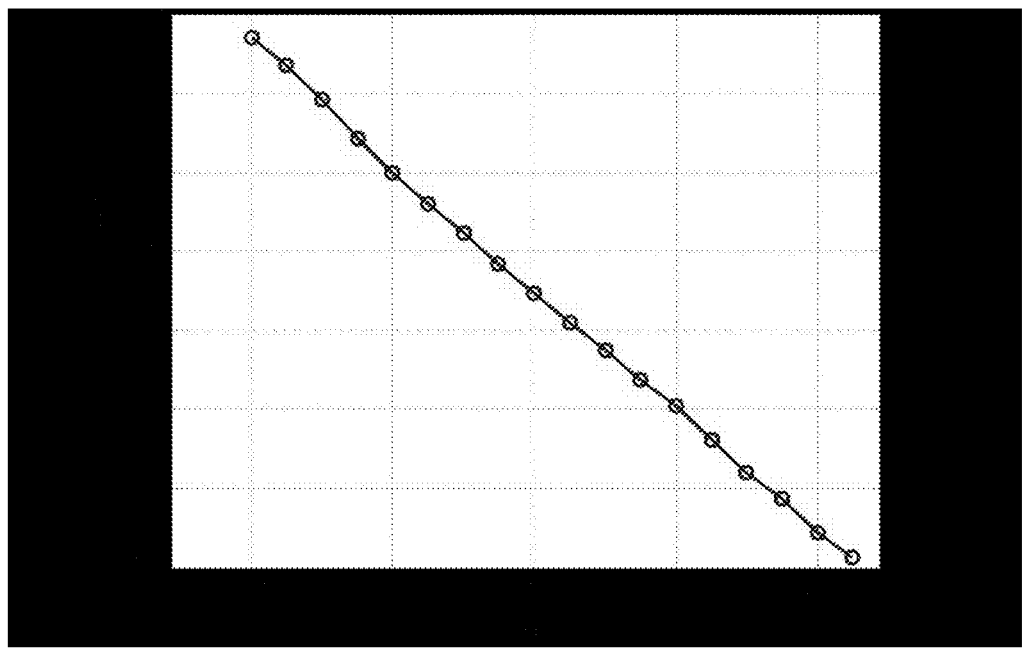
FIG. 3(b) illustrates a rotation versus z calibration curve for a particle imaged through a points spread function that rotates as the axial position of the particle changes.

Bright-field images of a gold bead at different defocus positions are shown in FIG. 3A as seen through a point spread function microscope. An angle estimator algorithm may be used to determine the angle of the two lobes. The axial position of the sample correspond to the rotation angle of the two lobes in the image using the rotation versus z calibration curve shown in FIG. 3B.

To measure the precision of the active control, in some embodiments, a measurement that is more precise and accurate than the feedback signal may be used. Very bright fluorescent beads, for example, can provide precision within a few nanometers and, therefore, may be used to test the performance of drift correction. A specific embodiment may include a coverslip with 100 nm gold nanoparticles (e.g., fiducial markers) and a dilution of 200 nm fluorescent beads (660/680 from Invitrogen) deposited on the coverslip and left to dry for a number of hours (e.g., 2 or more hours). The fluorescent beads and fiducial markers may then be imaged with the switching scheme where the fluorescent beads are imaged 3 times for every image of gold beads. The camera acquisition rate may be set at 20 Hz and the feedback signal may be acquired at 5 Hz. For drift correction algorithm, N=9 and M=5 may be used. Both the fluorescence signal and gold particle scattering may be set to use the full dynamic range of the camera.

In some embodiments, a first experiment was performed without adaptive drift correction to measure the precision of the fluorescent bead localization. Approximately 5000 images of 4 fluorescent beads were taken and the sample was found to drift a total of ~40 nm in three dimensions during the 4 minute experiment. The positions of these beads were estimated. To calculate the precision of localization, the data had to be corrected for drift. The drift was estimated from the bead positions themselves using the boxcar moving average filter. After drift correction, the 3D localization precision was measured to be $\sigma bead(x,y,z)=(2.1, 2.1, 3.5)$ nm.

In some embodiments, in a second experiment, adaptive drift correction was applied and the localization precision of the fluorescent beads was measured again. The raw data of the fluorescent bead was used to calculate the precision without any a posteriori correction of the data, producing $\sigma bead\text{-}adapt(x,y,z)=(3.4, 3.4, 5.4)$ nm. Histograms of precision for both experiments are shown in FIG. 4A and FIG. 4B.

The measured localization uncertainty in the adaptive experiment may result from the uncertainty of the control and/or the inherent uncertainty in the fluorescent bead localization used to evaluate the precision. By comparing the fluorescent bead localization precisions in the two experiments, we find the precision of the adaptive drift correction. The precision $\sigma bead\text{-}adapt$ incorporates the compound uncertainty in fluorescent bead localization (estimated to be $\sigma bead$) and the uncertainty in the drift correction per se $\sigma adapt$. Therefore, the latter precision of 3D drift correction can be found as the geometric difference of the two experiments. As a result, the precision of drift correction was found to be $\sigma adapt(x,y,z)=(2.7, 2.7, 4.1)$ nm. We conclude that in this experiment the active drift correction method provides 2-4 nm precision in all dimensions. For most fluorescent molecules currently in use, the number of emitted photons is generally in the range 1000-2000 and the precision is limited to 20-50 nm. Hence, the added error being one order of magnitude lower is appropriate to generate virtually drift-less images.

Figures 4A, 4B:
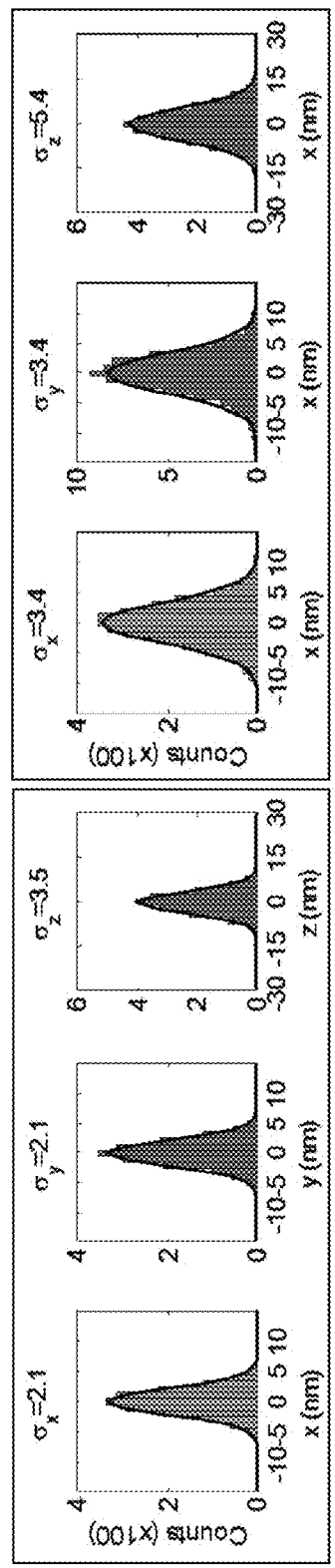
FIG. 4A and FIG. 4B illustrate experimental results evaluating the precision of active drift correction using embodiments described herein.

FIG. 4A and FIG. 4B illustrate experimental results evaluating the precision of active drift correction using embodiments described in this document. A bright fluorescent bead is localized with and without adaptive drift correction. The plots show precision histograms for a fluorescent bead with a posteriori correction but without adaptive correction (left) and with adaptive correction (right). The geometric difference of the two uncertainties provides the precision of the adaptive drift correction method.

If brighter fluorophores are used and/or more precise single molecule measurements achieved, active drift correction under 1 nm precision is possible by proper control parameter selection. In this experiment, for instance, the gold-bead image acquisition rate was 5 Hz. A correction rate slower than 0.5 Hz would work well for experiments where the drift rate is under 0.5 nm/sec. Such drift rate is typical in super-resolution experiments. Therefore, by optimizing the correction rate and increasing N or M, the drift correction precision can be further improved.

Figure 5:
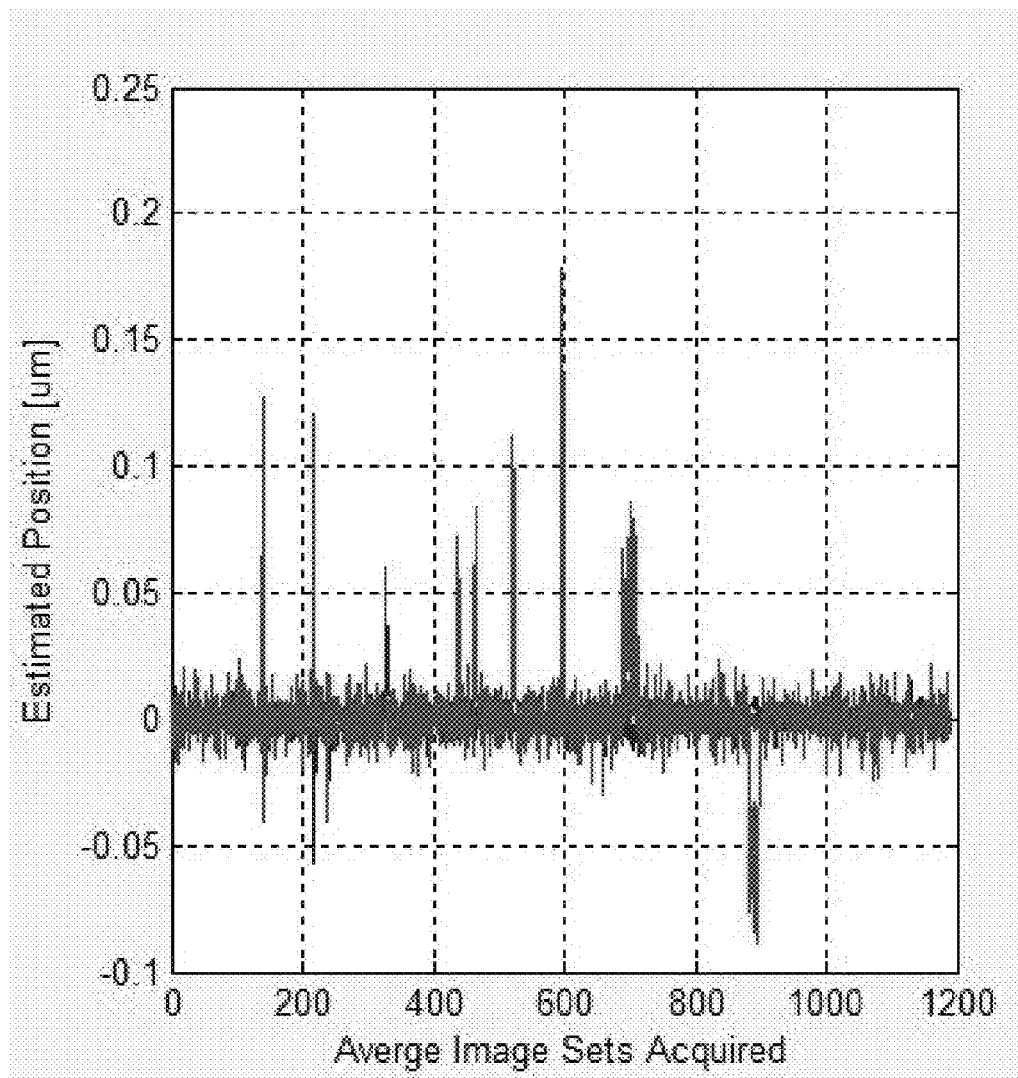
FIG. 5 illustrates results of an experiment demonstrating adaptive drift correction over a long time.

An experiment demonstrating adaptive drift correction over a long time is shown in FIG. 5 where the stage is being actively stabilized. Manual translations along one of the axes are introduced in the sample and active stabilization brings the stage and the sample back to the original position. The blue, green and red curves show the measured x-y-z positions of the gold beads and the ability to bring the sample back to initial position. The spikes in the plot illustrate instances when the stage was forced to a new position in one direction and the control brought the sample back to its initial position. This can be seen for all the three axes. The experimental parameters are the same as described above.

FIG. 5 illustrates results of an experiment to demonstrate drift compensation using the proposed method. Blue, green and red curves are for the estimated x, y and z positions of the sample. The spikes are when the stage was purposely moved away and the control brought it back to the original position.

A super-resolution localization microscopy experiment has been performed with the real-time adaptive drift correction method according to various embodiments described herein. In this experiment, for example, imaging was performed on fixed PtK1 cells (for example, rat-kangaroo kidney epithelial cells) tagged with a tubulin antibody labeled with Alexa 647.

FIGS. 6A, 6B, 6C, and 6D illustrate 3D super-resolution localization imaging with adaptive drift correction in 3D based on the results of this experiment. FIG. 6A illustrates super-resolution image of microtubules in PtK1 cells. FIG. 6A is a histogram of transverse localizations of a microtubule with FWHM=88 nm. FIG. 6C is a zoomed in super-resolution image. FIG. 6D illustrates a normal fluorescent images of the region illustrated in FIG. 6A. The colormap, for example, represents the depth.

Embodiments described in this document demonstrate an adaptive drift correction system that may compensate for drift in three-dimensions (e.g., in real time) with precision. With this method, the setup, the sample preparation and the imaging protocol require minimal changes and can be implemented with any localization microscopy approach. Examples described in this document use a single-molecule imaging path for the feedback signal, there may be full correlation between the motion of fiducials (e.g., gold beads) and the molecules drift. As a result, some embodiments may avoid the problem that arises from the independent motion among separate channels. The problem of fluorescent fiducials is overcome by the use of fixed gold beads that do not interfere with the non-bright field signal (e.g., a single molecule signal) (e.g., multiplexed in time to avoid crosstalk) and do not bleach. While gold nanoparticles have been used as fluorescent fiducial markers, here they are used as absorbers and imaged in bright-field transmission. As an alternative to gold beads, scattering centers can be created on the coverslip by lithography or direct-laser writing The system enables experiment-dependent optimization of parameters such as integration time, number of bead localizations, and update frequency to achieve the target precision of one order of magnitude better precision than the single-molecule localization precision or any other precision.

In some embodiments, the optical system optimization for 3D localization with engineered point spread function may enable not only precision localization but may also extend the depth range enabling longer field of view and recovery from potential fast shifts of a sample due to vibrations or bumps to the system. In some embodiments, this real-time adaptive imaging method may be readily applied to other imaging modalities where drift or perturbation problems may exist such as, for example, in live cell imaging or biophysical measurements.

In some embodiments, gold beads may be deposited on the coverslips by the following method. First, 100 μl of 0.1% PolyL-Lysine (Ted Pella) is placed on the coverslips cleaned to the quality of cell culture and dried in air for 30 min. The coverslips are then rinsed with pure water and blow-dried. After this, 100 μl solution of 5% (1:20 diluted in water) 100-nm gold nanoparticles (from Microspheres-Nanospheres; 5.6e9 per ml) is placed on the coverslip and let sit for 30 min. The coverslips are then rinsed with pure water and blow-dried. After this, a 100 nm layer of $SiO_2$ is deposited (using Plasmatherm PECVD) on the coverslips. This is a key step and is required to make the gold nanoparticles immobile on the coverslip, which is important for accurate drift estimation. The coverslips are then exposed to UV for long duration. The slides are then ready for culturing cells for super-resolution experiments.

In some embodiments, the position coordinates from images of a point spread function system may be extracted using an Angle-centroid estimator (AE). Various other estimators may be used. The AE works by first adaptively thresholding the image to separate the two lobes and then finding the weighted center of each lobe separately. Then the centroid positions of the two lobes (x1, y1) and (x2, y2) are used to find the center (x, y) of the point spread function by taking the mean. The angle of the line joining the two centroids with respect to horizontal is also determined from these centroid positions. Thus the AE gives the x, y positions and rotation angle from the image as shown in FIGS. 7A and 7B. The rotation angle is a function of the axial z position. Thus by taking a calibration measurement, this relation between the rotation angle and z position can be found. FIGS. 7A and 7B illustrate a schematic of this process for a point spread function image at a defocus position. While the AE is not an optimal estimator for position estimation, it is very fast and accurate. Other modifications of AE which involve fitting the two lobes with Gaussians and then determining the lobe positions have been proposed and successfully used.

FIG. 7A and FIG. 7B illustrate a description of an Angle-centroid estimator (AE). FIG. 7A illustrates a camera image passed onto AE. FIG. 7B illustrates a thresholded image to separate two lobes and their individual centroids denoted by red+signs. The line joining the centroids gives the angle of rotation with respect to horizontal.

Figure 8:
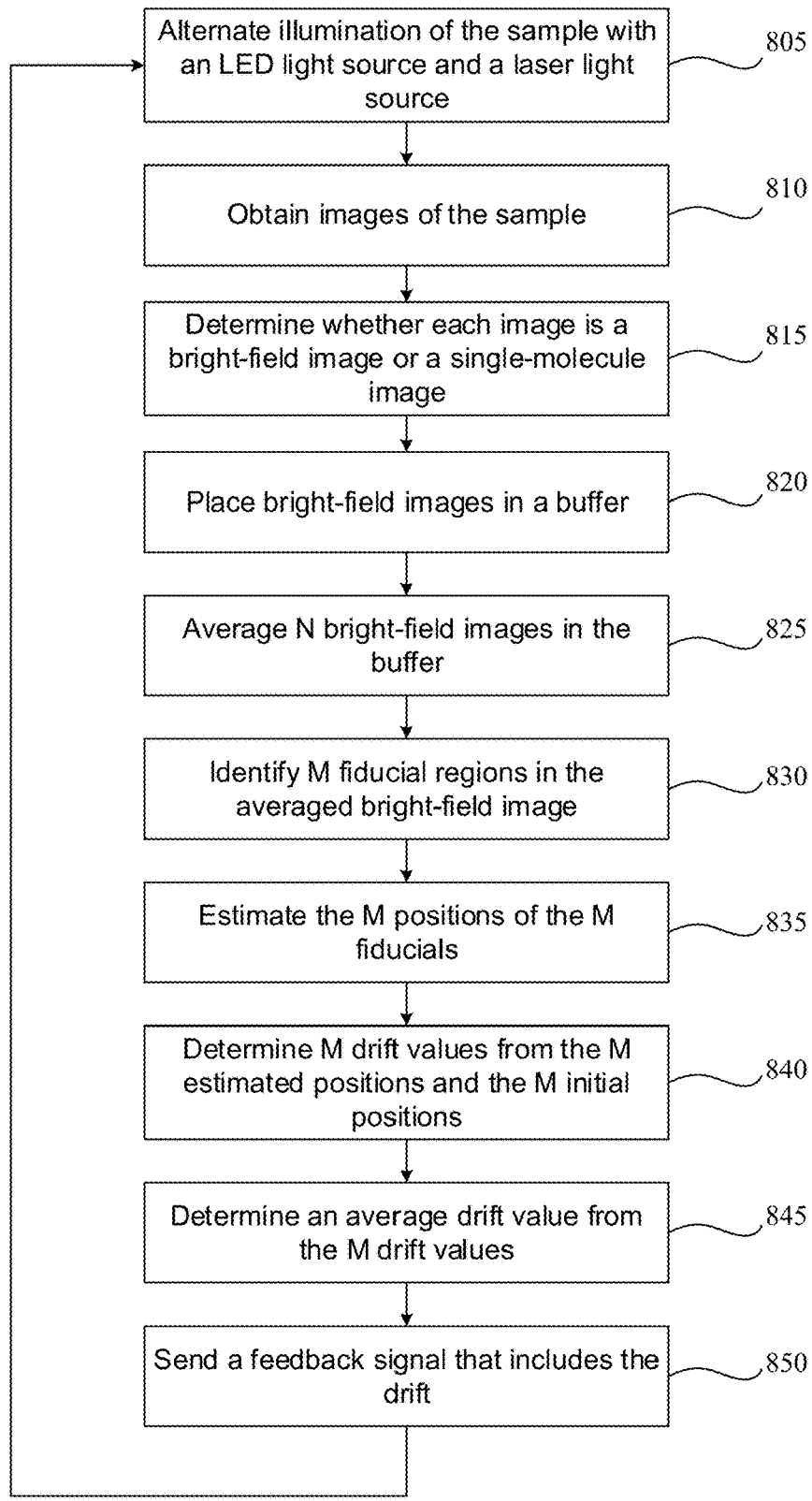
FIG. 8 illustrates a process for adjusting for drift according to some embodiments described in this document.

FIG. 8 illustrates a process 800 for adjusting for drift according to some embodiments described herein. One or more steps of the process 800 may be implemented, in some embodiments, by one or more components of imaging system 200 of FIG. 2, such as by feedback logic 205. Although illustrated as discrete blocks, various blocks may be divided into additional blocks, combined into fewer blocks, or eliminated, depending on the desired implementation.

Process 800 begins at block 805 where two light sources alternately illuminate a sample. The two light sources may include the first light source 265 and the second light source 295. In some embodiments, the first light source may include an LED light source and/or the second light source may include a laser light source. In some embodiments, the first light source may illuminate the sample for longer periods of time. FIG. 9 is an illustration showing an example timing of the first light source and the second light source. Any timing scheme can be used.

At block 810 images are obtained such as, for example, using the image sensor 210. The images may include images of the sample when illuminated with the first light source 265 and when illuminated with the second light source 295. An example timing for capturing images with the image sensor 210 is shown in FIG. 9. In some embodiments, multiple images may be captured during a period when either the first light source or the second light source are illuminating the sample.

At block 815 it can be determined whether a given image is a bright-field image or a non-bright field image (e.g., a single-molecule image). This can be accomplished, for example, by determining the average and/or peak values of the image and/or comparing the result to a threshold value.

At block 820, the bright-field images may be placed in a buffer. The bright-field images may be averaged at block 825 creating an average bright-field image.

At block 830 M fiducial regions may be identified in the average bright-field image that each includes at least one fiducial. In some embodiments, the regions may only be identified once during the process or previous to execution of the process. The regions, for example, may be identified by a user or by an algorithm.

At block 835 the position of the M fiducials may be estimated in the bright-field image. Any number of techniques may be used to identify the location of the fiducicial within the bright-field image and/or the specific region of the bright-field image. For example, the pixel location values may be used to determine a horizontal position values and vertical position values. The translation between pixel values and location of a fiducial may be determined via calibration. The axial position of a fiducial may be determined based on the point spread function. For example, axial position may be determined based on a correlation, for example, between the angle of rotation of two lobes in the image and the axial position. The translation between pixel values and location of a fiducial may be determined via calibration.

At block 840 drift values for the M fiducials may be determined such as, for example, by subtracting an original position of each of the M fiducials from the current position of each of the M fiducials. In some embodiments, an image may be set as the original image and any subsequent image may be used current image. In some embodiments, the original image may be the previous current image.

At block 845, an average drift value may be calculated form the M drift values by averaging the drift values for the M fiducials determined in block 840. At block 850 the average drift value may be sent to the positioning device. In some embodiments, the drift value may be converted from image values (e.g., pixel values) to position values of the sample on the positioning device. The positioning device may then translate the position of the sample based on the drift value.

After block 850, process 800 may repeat until ended by an external action (e.g., user interaction) or after a set number of iterations.

In some embodiments, process 800 and/or in conjunction with embodiments described in this document may be used or modified to be used for vibration control of a sample. In some embodiments, process 800 and/or in conjunction with embodiments described in this document may be used or modified to be used to find the precise position of part of a sample and reposition it at a different location with high precision. In some embodiments, process 800 and/or in conjunction with embodiments described in this document may be used or modified to be used to track the position of part of a sample. In some embodiments, process 800 and/or in conjunction with embodiments described in this document may be used or modified to be used to compensate for drift and/or vibration in a nano-fabrication system. In some embodiments, process 800 and/or in conjunction with embodiments described in this document may be used or modified to be used to compensate for drift and/or vibration in a nano-fabrication system where the sample is modified by wide field lithography. In some embodiments, process 800 and/or in conjunction with embodiments described in this document may be used or modified to be used to track and re-position the sample in a nano-fabrication system where the sample is modified by direct laser writing lithography.

Figure 10:
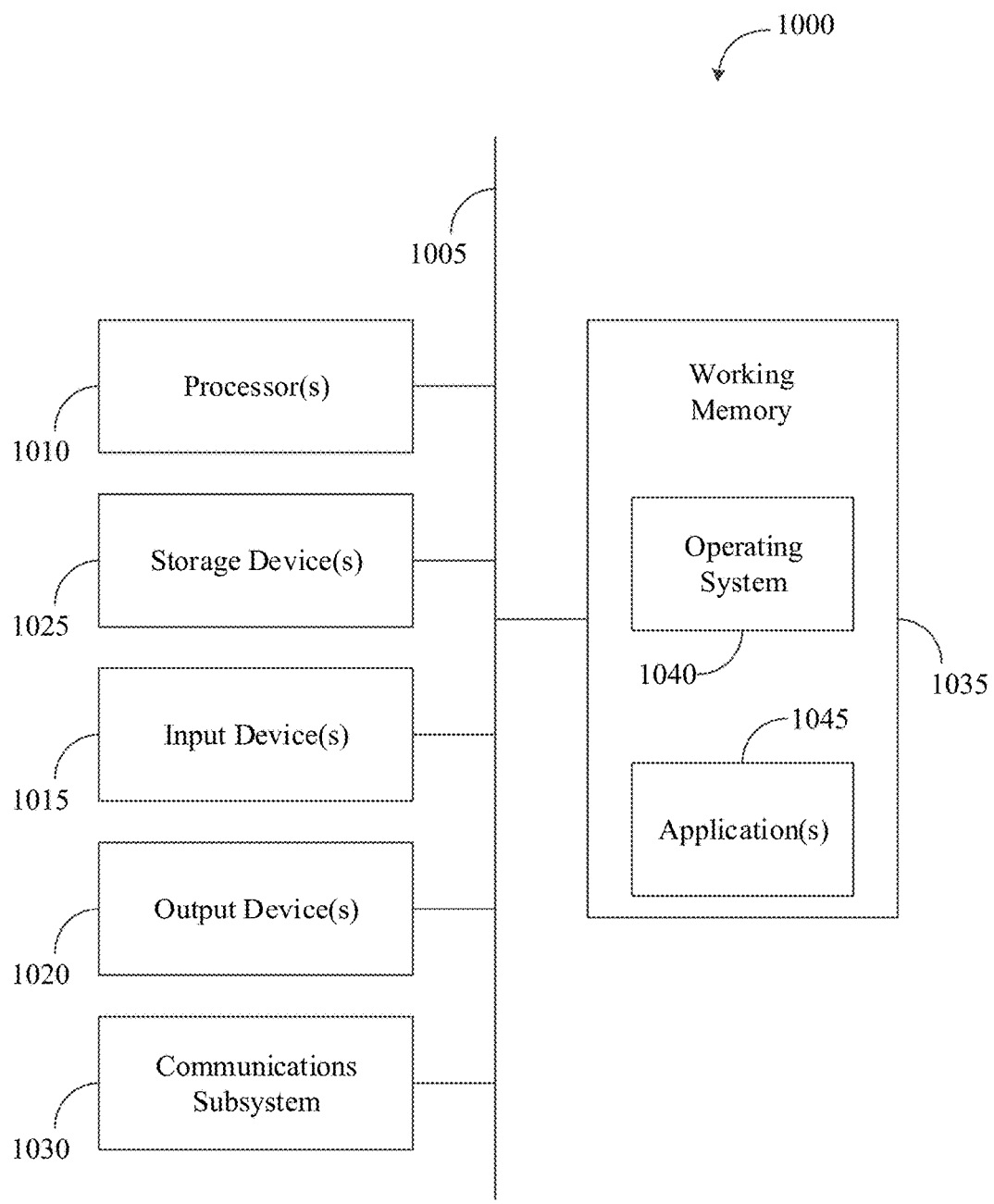
FIG. 10 illustrates an illustrative computational system for performing functionality to facilitate implementation of embodiments described in this document.

The computational system 1000 (or processing unit) illustrated in FIG. 10 can be used to perform and/or control operation of any of the embodiments described herein. For example, the computational system 1000 can be used alone or in conjunction with other components. As another example, the computational system 1000 can be used to perform any calculation, solve any equation, perform any identification, and/or make any determination described here. In some embodiments, computational system 1000 may be used to execute one or more blocks of process 800.

The computational system 1000 may include any or all of the hardware elements shown in the figure and described herein. The computational system 1000 may include hardware elements that can be electrically coupled via a bus 1005 (or may otherwise be in communication, as appropriate). The hardware elements can include one or more processors 1010, including, without limitation, one or more general-purpose processors and/or one or more special-purpose processors (such as digital signal processing chips, graphics acceleration chips, and/or the like); one or more input devices 1015, which can include, without limitation, a mouse, a keyboard, and/or the like; and one or more output devices 1020, which can include, without limitation, a display device, a printer, and/or the like.

The computational system 1000 may further include (and/or be in communication with) one or more storage devices 1025, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 1000 might also include a communications subsystem 1030, which can include, without limitation, a modem, a network card (wireless or wired), an infrared communication device, a wireless communication device, and/or chipset (such as a Bluetooth® device, a 802.6 device, a WiFi device, a WiMAX device, cellular communication facilities, etc.), and/or the like. The communications subsystem 1030 may permit data to be exchanged with a network (such as the network described below, to name one example) and/or any other devices described herein. In many embodiments, the computational system 1000 will further include a working memory 1035, which can include a RAM or ROM device, as described above.

The computational system 1000 also can include software elements, shown as being currently located within the working memory 1035, including an operating system 1040 and/or other code, such as one or more application programs 1045, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1025 described above.

In some embodiments, the storage medium might be incorporated within the computational system 1000 or in communication with the computational system 1000. In other embodiments, the storage medium might be separate from the computational system 1000 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1000 and/or might take the form of source and/or installable code, which, upon compilation and/or installation on the computational system 1000 (e.g., using any of a variety of generally available compilers, installation programs, compression/decompression utilities, etc.), then takes the form of executable code.

The term "substantially" means within 5% or 10% of the value referred to or within manufacturing tolerances.

Numerous specific details are set forth in this document to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

That which is claimed:

1. A system comprising:
    a positioning device configured to a hold a sample and adjust a position of a sample in response to receiving a drift compensation signal;
    a first light source disposed to transilluminate the sample;
    a second light source disposed to epi-illuminate the sample;

an optical system configured to receive light from the sample and generate a three-dimensional point spread function from the light from the sample;

an image sensor disposed relative to the optical system that produces an image from the light collected from the sample via the optical system; and logic electrically coupled with the image sensor and the positioning device, the logic configured to determine one or more drift compensation values from images imaged by the image sensor, and configured to send one or more drift compensation signals to the positioning device to compensate drift.

2. The system according to claim 1, wherein the one or more drift compensation values is determined based on a drift compensation value of one or more fiducials imaged be the image sensor.

3. The system according to claim 1, wherein the one or more drift compensation values is determined based on an average drift compensation value of a plurality of fiducials imaged be the image sensor.

4. The system according to claim 1, wherein the one or more drift compensation values is determined based at least in part on an imaged points spread function of one or more fiducials.

5. The system according to claim 1, wherein the optical system includes a phase mask that is encoded with the three-dimensional point spread function.

6. The system according to claim 1, wherein the first light source and the second light source alternate illumination of the sample.

7. The system according to claim 1, wherein the logic is configured to determine drift and/or vibration compensation from one or more bright-field images and/or an average number of bright-field images.

8. The system according to claim 1, wherein the logic is configured to determine drift and/or vibration compensation from a plurality of fiducial position measurements.

9. A method comprising:
illuminating a sample with a first light source, the sample including a plurality of fiducial markers;
receiving through an optical system a first bright-field image of the sample when illuminated with the first light source, the optical system having a point spread function that varies with axial position of a point of the sample;
determining a first plurality of positions for the plurality of fiducial markers in the first bright-field image;
illuminating the sample with the first light source;
receiving through the optical system a second bright-field image of the sample when illuminated with the first light source;
determining a second plurality of positions for the plurality of fiducial markers in the second bright-field image;
determining a drift value of each of the plurality of fiducial markers based on the first plurality of positions and the second plurality of positions;
determining a sample movement value from the drift value; and
sending the sample movement value to a positioning device upon which the sample is disposed to compensate drift.

10. The method according to claim 9, further comprising moving the sample based on the sample movement value.

11. The method according to claim 9, wherein the position of each of the fiducial markers is determined in three dimensions and the sample movement value comprises at least three values for each of the three dimensions.

12. The method according to claim 9, wherein at least a portion of the position of each of the fiducial markers is determined from a pixel location within the first bright-field image and the second bright-field image.

13. The method according to claim 9, wherein at least a portion of the position of each of the plurality of fiducial markers is determined from an angle of rotation of a manifestation of two lobes of a point spread function image of each of the plurality of fiducial markers.

14. The method according to claim 9, further comprising:
illuminating the sample with a second light source during a period of time when the first light source is not illuminating the sample;
receiving through the optical system a third image of the sample when illuminated with the second light source; and
comparing an average and/or peak values of the third image with a threshold value to determine whether the third image was produced from light from the first light source or light from the second light source.

15. A system comprising:
a positioning device configured to a hold a sample and adjust a position of a sample in response to receiving a drift compensation signal;
an optical system configured to receive light from the sample and generate a three-dimensional point spread function from the light from the sample;
an image sensor disposed relative to the optical system that produces an image from the light collected from the sample via the optical system;
a first light source disposed such that the positioning device is disposed between the first light source and the image sensor; and
logic electrically coupled with the image sensor and the positioning device, the logic configured to determine one or more drift compensation values from images imaged by the image sensor, and configured to send one or more drift compensation signals to the positioning device to compensate drift.

16. The system according to claim 15, wherein the image sensor is configured to produce bright-field images of the sample when the sample is illuminated with the first light source.

17. The system according to claim 15, further comprising:
a second light source configured to illuminate the sample and disposed so that light from the second light source is reflected from the sample prior to being received at the image sensor.

18. The system according to claim 17, wherein the second light source comprises an epi-illumination light source and the first light source comprises a transillumination light source.

19. The system according to claim 17, wherein the first light source and the second light source alternate illumination of the sample.

20. The system according to claim 15, wherein the logic is configured determine a first plurality of positions for a plurality of fiducial markers in the image.

21. The system according to claim 15, wherein at least a portion of a first plurality of positions of each of a plurality of fiducial markers is determined at least in part from an angle of rotation of a manifestation of two lobes of a point spread function image of the plurality of fiducial markers.

* * * * *